United States Patent

[15] 3,648,965

Daddona

[45] Mar. 14, 1972

[54] GASKET FOR PLASTIC CASTING

[72] Inventor: Paul R. Daddona, Greenwich, Conn.

[73] Assignee: The Polycast Technology Corporation, Stamford, Conn.

[22] Filed: Aug. 24, 1970

[21] Appl. No.: 66,236

[52] U.S. Cl..............................249/134, 249/82, 249/187, 18/39, 18/47 R
[51] Int. Cl. .......................................B29c 1/00, B29c 5/00
[58] Field of Search....................249/82, 134, 160, 117, 187; 18/34 R, 26 R, 39, 42 R, DIG. 31

[56] References Cited

UNITED STATES PATENTS

| | | | |
|---|---|---|---|
| 2,154,639 | 4/1939 | Rohm et al. | 18/39 X |
| 2,390,129 | 12/1945 | Shobert | 249/82 X |
| 2,687,555 | 8/1954 | Anspon et al. | 249/82 X |
| 2,817,878 | 12/1957 | Anspon et al. | 18/39 X |
| 2,867,003 | 1/1959 | Stiles | 249/82 |
| 3,056,166 | 10/1962 | Weinberg | 18/39 |
| 3,248,758 | 5/1966 | Schmitz et al. | 18/39 X |
| 3,273,205 | 9/1966 | Hanley | 18/39 |
| 3,404,861 | 10/1968 | Eiver | 18/39 X |
| 3,529,321 | 9/1970 | Culand | 18/34 R X |
| 3,551,541 | 12/1970 | Rossetti | 18/26 R X |

*Primary Examiner*—J. Howard Flint, Jr.
*Attorney*—Curtis, Morris and Safford

[57] ABSTRACT

A gasket for use in an apparatus for casting of acrylic plastic is shown. The permanent gasket seals a casting zone defined between two mold surfaces and includes a resilient inner core of plasticized polyvinyl chloride or silicone rubber having a durometer hardness between about 60 and 90 and a protective outer sheath around the inner core comprised of a thin layer of polyethylene or nylon.

12 Claims, 3 Drawing Figures

PATENTED MAR 14 1972　　3,648,965

INVENTOR.
PAUL R. DADDONA

BY
Curtis, Morris & Safford
ATTORNEYS

GASKET FOR PLASTIC CASTING

This invention relates to an apparatus for casting acrylic plastics. More specifically, it relates to a gasket for separating and sealing the casting zone defined between two closely adjacent mold surfaces.

Processes and apparatus for the casting of acrylic plastics and more particularly the casting of flat sheets thereof, are known. Typically a monomer or a partial polymer of synthetic resin is introduced into a casting zone bounded by two parallel plates of glass, metal or other smooth inert material. The plates are spaced apart at their periphery by a gasket which is compressible so that shrinkage of the polymerizing sheet can take place without separation of the sheet from the mold surface. The mold surfaces and gasket are usually held together by clamps or presses and subjected to polymerizing and curing conditions to form the solid product.

In most processes the gasket is a conventional plasticized vinyl extrusion. The gasket strip is placed around the outer edges of the glass or other smooth mold surface or is otherwise supported in position. During the polymerizing and curing of the acrylic monomer the vinyl gasket becomes an integral part of the casting and after polymerization is finished, it cannot be removed from the plastic sheet except by cutting it off.

The vinyl gaskets sometimes interfere with the casting of specification plastic sheet. Impurities in the vinyl gasket precipitate out of the gasket and cause voids or sink holes or inclusions in the final product. Furthermore, processors who use the cast plastic sheet require that the vinyl gasket be removed for several reasons. If the flat sheets are formed into other shapes via heating techniques, the hot vinyl spoils the surface of the sheet with which it comes in contact. If the sheet is to be machined, the vinyl gasket tends to gum up and interfere with the proper operation of the machining tool. Finally, most processers of cast acrylic sheet sell scrap from their operations to reclaimers who crack the scrap and produce regenerated monomer. Obviously, this cannot be done if there is vinyl gasketing in the scrap.

In addition to the foregoing, there are other reasons for improving upon conventional vinyl gasketing in acrylic casting operations. For example, the requirement that a new vinyl gasket be used in each casting operation is expensive not only from the standpoint of the vinyl material itself but also from the standpoint of the time required to locate a new gasket in the proper position between the mold surfaces. Also, there is loss of time and inefficient use of capital investment when labor and machines are required to cut gasketing from the edge of cast acrylic sheets, and a loss of acrylic as well.

It is thus the primary object of this invention to provide a gasket for use in acrylic casting operations which separates cleanly from the cast sheet.

It is a further object of this invention to provide a gasket that is inert to the acrylic material with which it comes in contact and which has sufficient mechanical strength to withstand the fluid pressures in the casting zones.

It is still a further object of this invention to provide a permanent gasket which is resilient and dimensionally stable under the conditions of casting to allow for polymerization shrinkage during curing but which fully recovers its original thickness after each casting, so that each successive casting will be of the same thickness.

It has now been found that these and other objects of this invention are accomplished in a gasket comprised of two parts; a resilient inner core comprised of a compressible elastomer having a durometer hardness broadly between 60 and 90; and a thin outer sheath consisting essentially of an acrylic-impervious polymer. Advantageously, the resilient inner core is either a plasticized polyvinyl chloride or a silicone rubber and the outer sheath is nylon or polyethylene.

It has been found that a gasket having an inner core of silicone rubber is particularly useful in that it does not permanently set under the compressive forces encountered in the casting operation. Thus, such gaskets may be used over and over again whereas gaskets having an inner core of polyvinyl chloride are compressively set and thus can only be used once. Still further, it has been found that the inner core material should have a hardness of broadly between 60 and 90 durometer. Where the inner core is plasticized polyvinyl chloride, the hardness should be 60–80 durometer and where the inner core is silicone rubber, the hardness should be 70–90 durometer.

In searching for gasket materials to meet the several objectives set forth above, it was found that no single material could satisfy all requirements. Few organic materials are inert to hot acrylic plastics, for example methylmethacrylate, as the latter are excellent polar solvents. Many materials such as polyvinyl alcohol or regenerated cellulose are either rapidly attacked by the casting fluid or they harden up and crack or otherwise deteriorate after very few castings. Metals such as aluminum are satisfactorily inert but their surface is so hard that a resilient metal gasket is difficult to design free of leaks, particularly at corners and other joints.

It has been found that excellent materials for the sheath, which are sufficiently inert to the acrylic casting material and which can withstand repeated exposure to hot acrylic monomer or partial polymer, are nylon and polyethylene.

Figure 1:
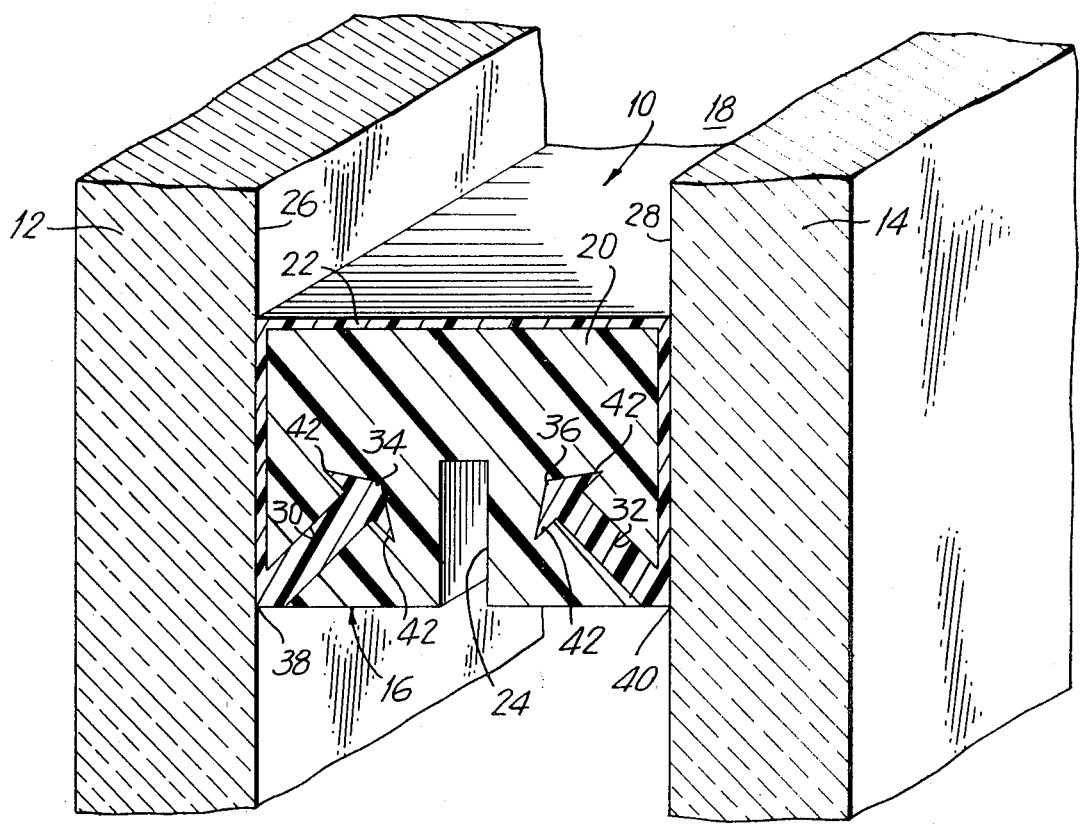
FIG. 1 is a section view of two glass sheets separated by a resilient sealing gasket according to this invention.

In FIG. 1, reference numeral 10 refers generally to two glass panels or sheets which are separated by a resilient sealing gasket having an inner core and an outer sheath, the combination of glass sheets and gasket defining a casting zone for the casting of acrylic plastic. Reference numeral 12 refers to a first glass sheet and reference numeral 14 to a second glass sheet. These sheets are separated by gasket 16 which totally encloses a casting zone, 18.

Reference numeral 20 refers to the inner core of gasket 16 and reference numeral 22 refers to the outer sheath of gasket 16. A slot, designated by reference numeral 24, in the lower central portion of gasket 16, mates with a gasket holder or supporting frame for the gasket. Section 24 may be of any suitable cross section and may have interlocking features or recesses for firm connection with a supporting piece for the gasket.

The inner core 20 is comprised of plasticized polyvinyl chloride or alternatively of silicone rubber. In both instances, the core is compressible in that it will respond to inwardly acting forces on the glass sheets 12 and 14 and under those forces, will compress. This is extremely important in the casting of acrylic plastic, as during the polymerization thereof, the polymerizing monomer mass shrinks in volume by approximately 22 percent and if the sealing gasket did not shrink with the mass, the cast plastic sheet would pull away from the glass walls 26 and 28 of casting zone 18 and result in a product having imperfect surface qualities. This product would then have to be discarded as off-specification.

The plasticized polyvinyl chloride inner core is extremely useful for the foregoing reasons but has one significant disadvantage which is overcome with the silicone rubber. That is, the plasticized polyvinyl chloride does not return to its original configuration after being subject to the compressive forces encountered during the casting process. The silicone rubber, on the other hand, after being subject to the substantial forces acting on the periphery of the casting zone and thus, upon itself, does return to its original configuration and may be used again and again in subsequent casting operations.

It has been found that in order to achieve satisfactory sealing and compressing characteristics in a gasket, that the gasket should be of a certain hardness. The plasticized polyvinyl chloride inner core should have a hardness of from 60 to 80 durometer and the silicone rubber core should have a hardness of from 70 to 90 durometer. Of course, minor variations in these ranges are possible depending on the particular conditions of the casting process, the monomer used and the forces exerted upon the gaskets.

The outer sheath 22 may be any polymeric material which is impervious to the acrylic monomer cast within the casting zone. By impervious is meant a polymeric material which does not materially react, soften, weaken or otherwise deteriorate, dissolve or change its physical properties in the presence of an acrylic material. The desired result, of course, is that the gasket not affect the quality of the polymerizing monomer adjacent to it and that its sealing properties be unchanged during the casting operation.

Where the inner core is plasticized polyvinyl chloride, the outer sheath is desirably nylon or polyethylene. The nylon or polyethylene encompasses the inner core on three sides, as shown in FIG. 1, and protects the inner core from contact with the acrylic monomer in the casting zone. Where the inner core is silicone rubber, the outer sheath is preferably "Teflon."

In order to firmly attach the outer sheath to the inner core, it has been found that the sheath should not completely envelope the core, but rather that a connection zone should be provided in the parts of the gasket which do not come in contact with the acrylic monomer. As shown in FIG. 1, reference numerals 30 and 32 refer to channels in inner core 20 into which the sheath 22 passes. Channels 30 and 32 have laterally extended termination zones 34 and 36, into which the sheath also passes. Preferably channels 30 and 32 originate at the outer bottom corners 38 and 40 of inner core 20, however, they may originate at other places along the lower edges of the gasket. Termination zones 34 and 36 have lateral extensions 42, into which the polymeric sheath material passes. These corners exert locking forces on sheath material 22, thereby closely and firmly securing the sheath to the inner core.

The two part gaskets described above are desirably formed in two steps. The plasticized polyvinyl chloride is, for example, extruded through a first dye and then is passed through a second dye wherein it is coated with nylon. The nylon coats the top and side surfaces of the gasket and flows into channels 30 and 32 and termination zones 34 and 36.

It has been found that the thickness of the outer sheath may be varied within limits, depending upon the particular acrylic-impervious, polymeric material which is used. In addition, it has been found that the thickness of the sheath need not be as great at the sides of the gasket as on the top face of the gasket, as the former is subjected to more rigorous service than the latter. Where the sheath is nylon, for example, the sheath thickness may vary from 0.005 to 0.015 inch. Desirably, the thickness of the sheath at the side of the gasket is about 0.005 inch and the thickness at the top or face of the gasket is about 0.015 inch. Likewise, where the sheath material is polyethylene, the overall range of sheath thickness is preferably from 0.015 to 0.035 inch. The thickness at the sides of the gasket is desirably about 0.015 and the thickness at the top or face of the gasket is desirably about 0.035 inch. Where "Teflon" is used as the sheath material, the thickness of the sheath is broadly from 0.003 to 0.008 inch. Obviously, small changes within the foregoing range of sizes can be made in connection with any particular casting process.

Figure 2:
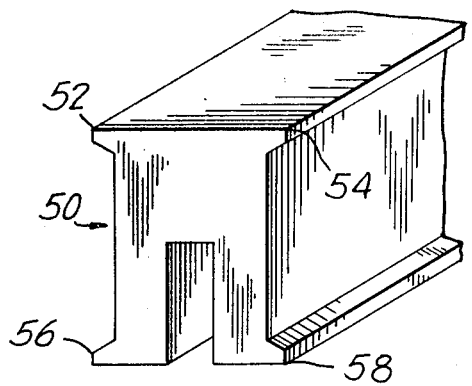
FIG. 2 is a section view of an alternative design for the gasket of this invention.

In FIG. 2, reference numeral 50, refers to an inner core of the materials discussed above having certain additional desirable features for a casting process for acrylic plastics. Thus, inner core 50 has extended corner sections 52, 54, 56 and 58. These are somewhat exaggerated in this drawing. The purpose of these extensions is to provide an additional measure of sealing at the corners of the gaskets where substantially higher compressive forces are encountered during the casting operation. With the corners offset as shown, the sealing forces of the gasket against the glass plate is higher or at least as high as that along the sides of the gasket.

Figure 3:
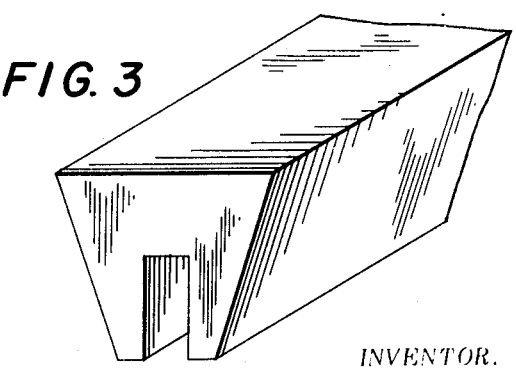
FIG. 3 is a section view of still a third gasket according to this invention.

In FIG. 3, the cross section of the gasket shown provides a substantially improved measure of sealing at the upper corners of the gasket, where the compressive forces are greater and likewise where the liquid head of the monomer in the casting zone exerts the greatest pressure. The gasket of FIG. 3 may be described as an inverted, truncated triangle. In FIG. 3, as well as in FIGS. 1 and 2, the gasket has female sections for mating with a suitable gasket support.

Plastic sheet made in casting zones sealed by the gaskets shown, can be removed therefrom and the gaskets do not adhere to the periphery of the cast sheet. Off-specification sheet is not produced as it is impossible for impurities to precipitate out of the inner core materials into the acrylic, causing voids, sink holes, or inclusions. Since there is no gasket adhering to the periphery of the cast sheet it is not necessary to cut a gasket and a portion of the acrylic sheet away.

What is claimed is:

1. A gasket for sealing a casting zone for acrylic plastics, including the elements of: a resilient inner core comprised of a compressible elastomer having a hardness between 60 and 90 durometer; and a thin outer sheath consisting essentially of an acrylic impervious polymeric material.

2. The gasket of claim 1, wherein the resilient inner core is plasticized polyvinyl chloride.

3. The gasket of claim 1, wherein the resilient inner core is silicone rubber.

4. The gasket of claim 1, wherein the outer sheath is nylon.

5. The gasket of claim 1, wherein the outer sheath is polyethylene.

6. The gasket of claim 1, wherein the outer sheath is "Teflon."

7. The gasket of claim 1, wherein said thin outer sheath is attached to said inner core by means of a locking channel located within said inner core, said channel having a laterally extended termination zone.

8. The gasket of claim 7, wherein two such channels, each terminated by a said laterally extended zone, are provided in said inner core, said channels originating at the lower bottom corners thereof.

9. The gasket of claim 1, wherein the upper and lower corners of said gasket are extended beyond the sides thereof.

10. The gasket of claim 1, wherein said inner core is shaped as an inverted truncated triangle.

11. A gasket for use in sealing a casting zone for acrylic plastics, including the elements of: a resilient inner core comprised of plasticized polyvinyl chloride having a hardness of from 60 to 80 durometer; and a thin outer sheath comprised of nylon having a thickness varying from 0.005 to 0.015 inch, said thickness being greater at the face of said gasket than at the sides thereof.

12. A gasket for use in sealing a casting zone for acrylic plastics, including the elements of: a resilient inner core comprised of a silicone rubber having a hardness of from 70 to 90 durometer; and a thin outer sheath comprised of "Teflon" having a thickness varying from 0.003 to 0.008 inch, said thickness being greater at the face of said gasket than at the sides thereof.

* * * * *